US011689900B2

(12) United States Patent
Akyurek et al.

(10) Patent No.: US 11,689,900 B2
(45) Date of Patent: *Jun. 27, 2023

(54) COMPRESSION OF INTERNET PROTOCOL VERSION 6 ADDRESSES IN WIRELESS SENSOR NETWORKS

(71) Applicant: Texas Instruments Incorporated, Dallas, TX (US)

(72) Inventors: Alper Sinan Akyurek, La Jolla, CA (US); Ariton E. Xhafa, Plano, TX (US); Jianwei Zhou, Allen, TX (US); Ramanuja Vedantham, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/330,715

(22) Filed: May 26, 2021

(65) Prior Publication Data

US 2021/0281985 A1 Sep. 9, 2021

Related U.S. Application Data

(63) Continuation of application No. 14/836,655, filed on Aug. 26, 2015, now Pat. No. 11,051,140.

(Continued)

(51) Int. Cl.
*H04W 4/18* (2009.01)
*H04L 61/103* (2022.01)
(Continued)

(52) U.S. Cl.
CPC ............. *H04W 4/18* (2013.01); *H04L 61/103* (2013.01); *H04L 2101/604* (2022.05);
(Continued)

(58) Field of Classification Search
None
See application file for complete search history.

(56) References Cited

U.S. PATENT DOCUMENTS 7,142,541 B2 * 11/2006 Kumar .................... H04L 45/04
  711/2
7,450,499 B2 * 11/2008 Park ....................... H04L 12/66
  370/254

(Continued)

FOREIGN PATENT DOCUMENTS

CN   102045412 A   5/2011
CN   103152770 A   6/2013
(Continued)

OTHER PUBLICATIONS

"CC2650 SimpleLink Multistandard Wireless MCU", Texas Instruments Inc., SWRS158, Feb. 2015, pp. 1-52.

(Continued)

*Primary Examiner* — Khaled M Kassim
*Assistant Examiner* — Berhanu D Belete
(74) *Attorney, Agent, or Firm* — Mandy Barsilai Fernandez; Frank D. Cimino

(57) ABSTRACT

A method for managing Internet Protocol Version 6 (IPv6) addresses in a wireless sensor network is provided that includes storing, on a wireless sensor device in the wireless sensor network, a prefix of an IPv6 address in association with a key, forming an address indicator for the IPv6 address, the address indicator consisting of the key and a node address of the IPv6 address, and storing the address indicator in at least one memory location on the wireless sensor device in lieu of the IPv6 address.

23 Claims, 3 Drawing Sheets

Related U.S. Application Data

(60) Provisional application No. 62/053,002, filed on Sep. 19, 2014.

(51) Int. Cl.
| | |
|---|---|
| *H04W 84/18* | (2009.01) |
| *H04L 101/659* | (2022.01) |
| *H04L 101/672* | (2022.01) |
| *H04L 101/681* | (2022.01) |
| *H04L 101/604* | (2022.01) |

(52) U.S. Cl.
CPC .. *H04L 2101/659* (2022.05); *H04L 2101/672* (2022.05); *H04L 2101/681* (2022.05); *H04W 84/18* (2013.01)

(56) References Cited

U.S. PATENT DOCUMENTS

| | | | |
|---|---|---|---|
| 8,015,315 B2 | 9/2011 | Chiang et al. | |
| 8,184,659 B2* | 5/2012 | Hamada | H04L 61/251 370/464 |
| 8,812,670 B2* | 8/2014 | Haddad | H04L 12/2807 709/225 |
| 9,300,583 B2* | 3/2016 | Purohit | H04L 45/7453 |
| 9,350,550 B2* | 5/2016 | Nix | H04L 9/0861 |
| 9,351,162 B2* | 5/2016 | Nix | H04L 9/0869 |
| 9,800,493 B2* | 10/2017 | Hui | H04L 49/3009 |
| 9,819,637 B2* | 11/2017 | Roitshtein | H04L 45/748 |
| 2003/0051016 A1* | 3/2003 | Miyoshi | H04L 61/5084 710/13 |
| 2003/0161332 A1* | 8/2003 | Ohno | H04N 7/18 370/402 |
| 2003/0179742 A1* | 9/2003 | Ogier | H04W 8/005 370/389 |
| 2004/0028040 A1 | 2/2004 | Kumar | |
| 2004/0139187 A1 | 7/2004 | Park | |
| 2004/0165602 A1 | 8/2004 | Park | |
| 2004/0205246 A1* | 10/2004 | Park | H04L 12/2809 370/310 |
| 2004/0236937 A1* | 11/2004 | Perkins | H04L 63/164 713/150 |
| 2006/0133390 A1* | 6/2006 | Sreekantiah | H04L 45/04 370/401 |
| 2007/0297402 A1 | 12/2007 | Koehler | |
| 2008/0222386 A1* | 9/2008 | Chiang | H04L 45/38 711/216 |
| 2008/0259925 A1* | 10/2008 | Droms | H04L 61/5061 370/392 |
| 2008/0263353 A1 | 10/2008 | Droms | |
| 2008/0307079 A1* | 12/2008 | Choi | H04L 67/025 709/223 |
| 2009/0041058 A1* | 2/2009 | Ikeda | H04L 69/167 370/475 |
| 2009/0146833 A1 | 6/2009 | Lee | |
| 2009/0161581 A1* | 6/2009 | Kim | H04L 61/5007 370/254 |
| 2009/0304026 A1* | 12/2009 | Hamada | H04L 61/251 370/466 |
| 2010/0080206 A1* | 4/2010 | Yamada | H04W 48/14 370/411 |
| 2010/0306351 A1 | 12/2010 | Lee | |
| 2011/0082866 A1 | 4/2011 | Brown | |
| 2011/0158160 A1* | 6/2011 | McCullough | H04W 40/02 370/328 |
| 2012/0063189 A1* | 3/2012 | Maurya | H04L 45/748 365/49.17 |
| 2012/0071098 A1* | 3/2012 | Chebbo | H04W 84/18 455/41.2 |
| 2012/0287932 A1 | 11/2012 | Haddad | |
| 2013/0031077 A1* | 1/2013 | Liu | G06F 7/02 707/706 |
| 2013/0091254 A1* | 4/2013 | Haddad | H04L 61/5014 709/220 |
| 2013/0091279 A1 | 4/2013 | Haddad | |
| 2013/0215810 A1* | 8/2013 | Wang | H04L 45/74 370/311 |
| 2013/0235862 A1 | 9/2013 | Kahng | |
| 2013/0294450 A1* | 11/2013 | Wang | H04L 45/748 370/392 |
| 2013/0346700 A1* | 12/2013 | Tomlinson | G06F 9/526 711/E12.07 |
| 2013/0346719 A1* | 12/2013 | Tomlinson | H04L 61/5038 711/E12.002 |
| 2014/0003436 A1* | 1/2014 | Wang | H04L 45/74591 370/392 |
| 2014/0244779 A1* | 8/2014 | Roitshtein | H04L 61/103 709/213 |
| 2014/0244861 A1 | 8/2014 | Donley | |
| 2014/0297826 A1* | 10/2014 | Park | H04W 4/38 709/223 |
| 2014/0365682 A1* | 12/2014 | Morris | H04L 45/16 709/238 |
| 2015/0098470 A1* | 4/2015 | Sun | H04L 45/748 370/392 |
| 2015/0172191 A1* | 6/2015 | Wang | H04L 45/748 370/392 |
| 2015/0207737 A1 | 7/2015 | Purohit | |
| 2015/0288604 A1 | 10/2015 | Boudreaux | |
| 2015/0319084 A1 | 11/2015 | Hui | |
| 2016/0165567 A1* | 6/2016 | Liu | H04B 17/318 455/456.2 |
| 2016/0182306 A1* | 6/2016 | Liu | H04W 84/18 370/255 |
| 2016/0227506 A1* | 8/2016 | Erickson | H04W 24/04 |
| 2018/0190096 A1* | 7/2018 | Lundy | G08B 21/02 |

FOREIGN PATENT DOCUMENTS

| | | |
|---|---|---|
| KR | 20080072784 A | 8/2008 |
| KR | 100878192 B1 | 1/2009 |

OTHER PUBLICATIONS

"Part 15.4: Low-Rate Wireless Personal Area Networks (LR-WPANs), Amendment 1:MAC sublayer", IEEE Standard for Local and Metropolitan Area Networks, IEEE Std 802.15.4e-2012, IEEE Computer Society, Apr. 16, 2012, pp. 1-225.

"Part 15.4: Low-Rate Wireless Personal Area Networks (LR-WPANs)", IEEE Standard for Local and Metropolitan Area Networks, IEEE Std 802.15.4-2011, IEEE Computer Society, Sep. 5, 2011, pp. 1-314.

S. Deering and R. Hinden, "Internet Protocol, Version 6 (IPv6) Specification", RFC 2460, Dec. 1998, pp. 1-36.

N. Kushalnagar et al, "IPv6 over Low-Power Wireless Personal Area Networks (6LoWPANs): Overview, Assumptions, Problem Statement, and Goals", RFC 4919, Aug. 2007, pp. 1-11.

Report of Search Report of First Office Action for Chinese Patent Application No. 2015105993284.

Machine Translation KR20080072784A—Foreign Document#3.

Machine Translation KR100878192B1—Foreign Document #4.

* cited by examiner

COMPRESSION OF INTERNET PROTOCOL VERSION 6 ADDRESSES IN WIRELESS SENSOR NETWORKS

CROSS-REFERENCE TO RELATED APPLICATIONS

This application is a continuation of U.S. patent application Ser. No. 14/836,655, filed on Aug. 26, 2015, which claims benefit of U.S. Provisional Patent Application Ser. No. 62/053,002, filed Sep. 19, 2014, both of which are incorporated herein by reference in their entirety.

BACKGROUND OF THE DISCLOSURE

Field of the Disclosure

Embodiments of the present disclosure generally relate to wireless sensor networks, and more specifically relate to compression of Internet Protocol Version 6 (IPv6) addresses in such networks.

Description of the Related Art

Wireless sensor networks are being deployed in many different environments. The sensors used in such networks are typically low cost devices with limited storage, computation, and power. The primary function of these devices is generally data acquisition, with an attendant function of communicating the acquired data over a wireless network. The typical architecture of these devices includes a microcontroller, memory on the order of magnitudes of tens of kilobytes split into read-only-memory and random access memory, a low power radio device, and power management circuitry. Given the limited memory capacity of these devices, conservation of memory usage is important.

SUMMARY

Embodiments of the present disclosure relate to methods, apparatus, and computer readable media for management of IPv6 addresses in a wireless sensor network. In on aspect, a method for managing Internet Protocol Version 6 (IPv6) addresses in a wireless sensor network is provided that includes storing, on a wireless sensor device in the wireless sensor network, a prefix of an IPv6 address in association with a key, forming an address indicator for the IPv6 address, the address indicator consisting of the key and a node address of the IPv6 address, and storing the address indicator in at least one memory location on the wireless sensor device in lieu of the IPv6 address.

In one aspect, a wireless sensor device is provided that includes a memory storing software instructions for managing Internet Protocol Version 6 (IPv6) addresses, and a processor configured to execute software instructions, in which execution of the software instructions stores a prefix of an IPv6 address in association with a key in the memory, forms an address indicator for the IPv6 address, the address indicator consisting of the key and a node address of the IPv6 address, and stores the address indicator in at least one location in the memory in lieu of the IPv6 address.

In one aspect, a non-transitory computer readable medium storing software instructions is provided. The software instructions, when executed by a processor of a wireless sensor device in a wireless sensor network, cause a method for managing Internet Protocol Version 6 (IPv6) addresses to be performed. The method includes storing, on a wireless sensor device in the wireless sensor network, a prefix of an IPv6 address in association with a key, forming an address indicator for the IPv6 address, the address indicator consisting of the key and a node address of the IPv6 address, and storing the address indicator in at least one memory location on the wireless sensor device in lieu of the IPv6 address.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
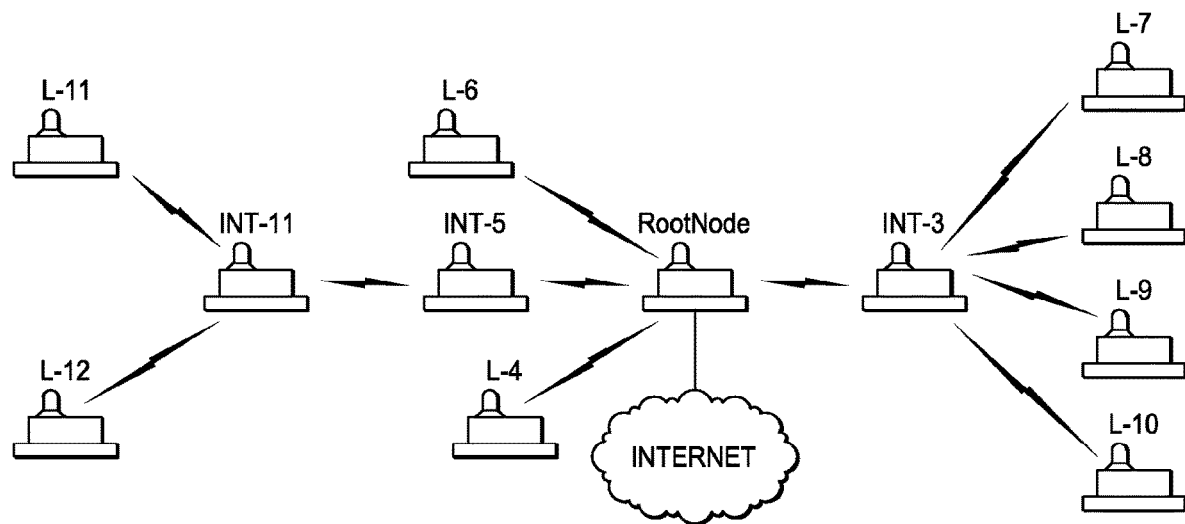
FIG. 1 is a simple example of an Internet Protocol Version 6 (IPv6) based wireless sensor network.

Specific embodiments of the disclosure will now be described in detail with reference to the accompanying figures. Like elements in the various figures are denoted by like reference numerals for consistency.

FIG. 1 is a simple example of an Internet Protocol Version 6 (IPv6) based wireless sensor network. In this example, the sensor devices labeled L-x are leaf nodes, the devices labeled Int-x are intermediate nodes, and the device labeled RootNode is the root node of the network and operates as a gateway to the internet. The device to device wireless communication is indicated by the "lightning bolt" arrows between the devices. The intermediate nodes and the root node may be operable to route communication around the network. Each of the devices implements a network protocol stack for communicating over the wireless network using IPv6 addresses.

IPv6 addresses are 128 bits long and may be presented in hexadecimal notation as "xxxx:xxxx:xxxx:xxxx:xxx:xxxx:xxxx:xxxx" where each "x" represents a hexadecimal digit and each grouping of four digits represents two bytes, e.g., "0000:FFE0:0000:0003:FFFF:FFFF:FFFC:00FD". Thus, storage of a full IPv6 address requires sixteen bytes of memory. A grouping of two hexadecimal digits of an IPv6 address may be referred to as an octet herein. The network protocol stack implementation may require that IPv6 addresses be stored in multiple locations, e.g., network table entries, on a device. Rather than storing a full IPv6 address, in embodiments of the disclosure, a device compresses the IPv6 address as described herein and stores the compressed version in the one or more multiple locations. When a full IPv6 address is needed for network communication, the device decompresses the compressed address as described herein.

Figure 2:
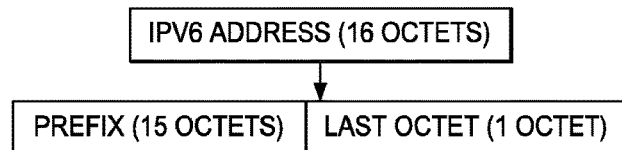
FIG. 2 is an example illustrating an IPv6 address.

In an IPv6 address, a prefix of N high-order octets specifies a particular network and the remainder of the octets specifies addresses within that network. Thus, the addresses of each node in the network may have a common prefix of N octets. The size of the prefix is based on the address space requirements of the network. For example, as illustrated in the example of FIG. 2, if the maximum number of nodes that can be addressed in a network is 256, the common prefix for a node address in that network is the 120 high-order bits, i.e., the high-order 15 octets. Further, the last octet uniquely identifies nodes in the network, i.e., is a node address.

Figure 3:
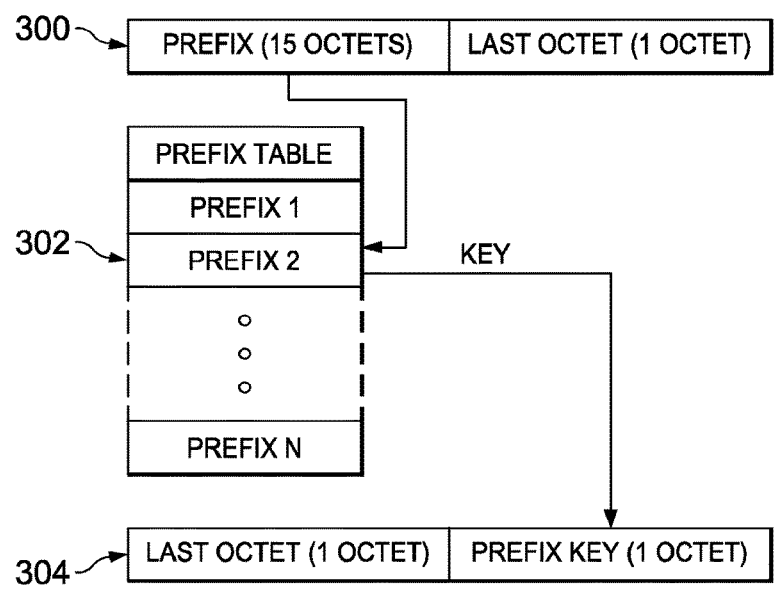
FIG. 3 and FIG. 4 are examples illustrating, respectively, IPv6 address compression and IPv6 address decompression.
Figure 4:
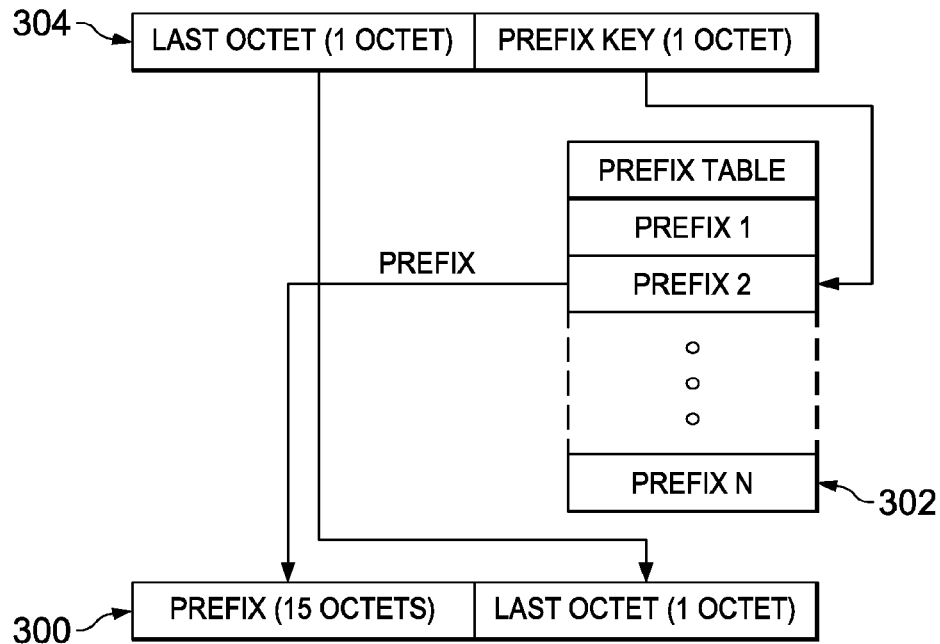

In some embodiments of the IPv6 address compression and decompression, the prefix for all IPv6 addresses within a wireless sensor network is assumed to be the high-order, i.e., top, 15 octets. FIG. 3 and FIG. 4 are examples illustrating, respectively, IPv6 address compression and IPv6 address decompression assuming that the prefix is the high-order 15 octets. Referring first to FIG. 3, to compress an IPv6 address 300 on a sensor device, the fifteen octet prefix of the address is stored in a prefix table 302 in the memory of the sensor device. The index of the table entry where the prefix is stored serves as a key for identifying the prefix. If the prefix of an address is already stored in the prefix table, the key is returned. The 8-bit key and the last octet of the address are then concatenated to generate a 16-bit IPv6 address indicator 304 that is stored in any location on the device in which the full IPv6 address would be stored. In some embodiments, the last octet is the first eight bits of the address indicator and the key is the last eight bits of the address indicator; in other embodiments, this order is reversed. Note that rather than storing a 128-bit address in multiple locations, a sixteen bit address indicator is stored in the multiple locations, a savings of 112 bits per location.

Referring now to FIG. 4, to decompress the address indicator 304 on the sensor device, the compression cycle is reversed. The prefix key in the address indicator 304 is used to locate the associated prefix in the prefix table 302. The identified prefix is concatenated with the last octet in the address indicator 304 to re-create the full IPv6 address 300.

The number of IPv6 addresses to be stored on a particular sensor device may vary. For example, in the network of FIG. 1, in order to route sensor data out of the network, a leaf node may store the address of the associated intermediate node and the address of the root node. For example, leaf device L-12 may store the IPv6 address of intermediate device Int-11 and the IPv6 address of the RootNode device. However, because leaf device L-6 is not associated with an intermediate node, the device may only store the IPv6 address of the root node. In some embodiments, a leaf node may also be aware of neighboring nodes and may store the IPv6 address of these nodes. For example, in such embodiments, leaf device L-10 may store the IPv6 addresses of leaf devices L-9, L-8, and L-7 as well as the IPv6 addresses of the intermediate device Int-3 and the RootNode device.

An intermediate node performs routing functions for associated leaf nodes, and thus may need to store the IPv6 addresses of the associated leaf nodes and of the root node. For example, in the network of FIG. 1, intermediate device Int-11 may store the addresses of associated leaf devices L-11 and L-12 and intermediate device Int-5 may store the address of intermediate device Int-11. The root node also performs routing functions and serves as a gateway to the Internet. In some embodiments, the root node may store the IPv6 address of all nodes in the network.

Figure 5:
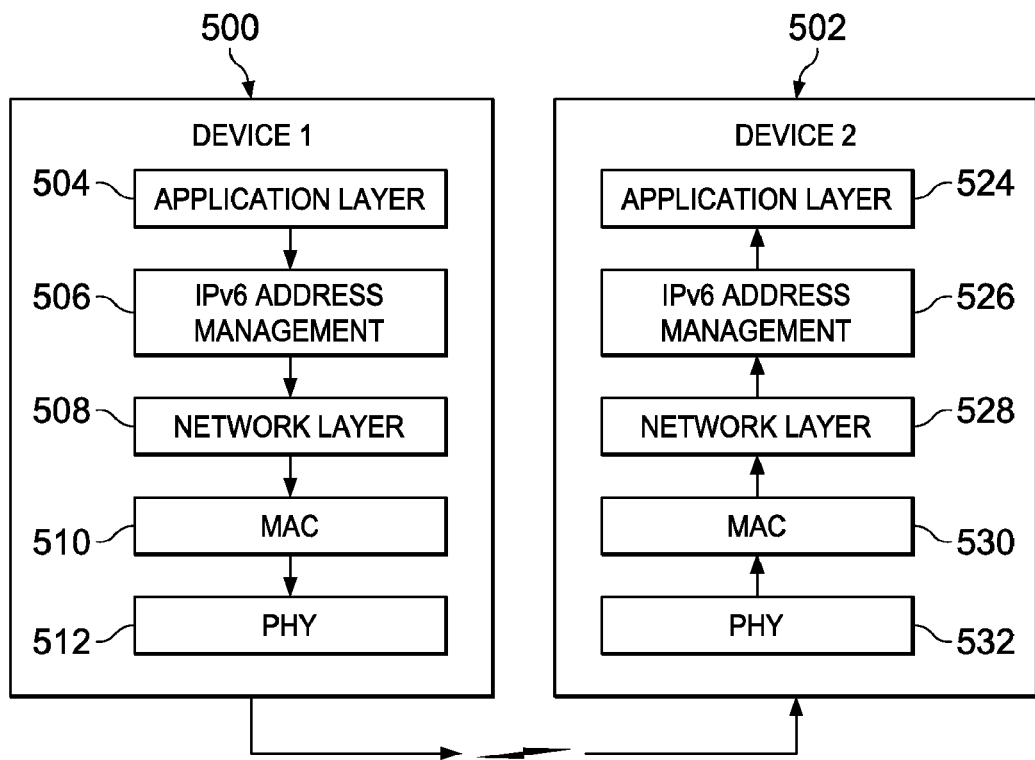
FIG. 5 illustrates the operation of the IPv6 address compression and decompression in the context of an example network protocol stack.

As previously mentioned, devices in the wireless sensor network implement a network protocol stack. FIG. 5 illustrates the operation of the above described IPv6 address compression and decompression in the context of an example network protocol stack. The example network protocol stacks on the two devices 500, 502 include an application layer 504,524, a network layer 508, 528, a Media Access Control (MAC) layer 510, 530, and a physical (PHY) layer 512, 532. An IPv6 address management component 506, 526 logically operates between the application layer 504, 524 and the network layer 508, 528 to compress IPv6 addresses to form address indicators prior to storage and to decompress address indicators to re-create full IPv6 addresses.

The MAC layer 510, 530 and the PHY layer 512, 532 may operate according to the IEEE 802.15.4 and IEEE 802.15.4e standards for these layers. The IEEE 802.15.4 standard provides PHY and MAC layer specifications for low-data-rate wireless connectivity with fixed, portable, and moving devices with no battery or very limited battery consumption requirements. IEEE 802.15.4e specifies an enhanced MAC layer protocol for such networks. Detailed descriptions of these protocols may be found in IEEE Std. 802.15.4™-2011, "Part 15.4: Low-Rate Wireless Personal Area Networks (LR-WPANs)" and IEEE Std. 802.15.4e™-2012, "Part 15.4 Low-Rate Wireless Personal Area Networks (LR-WPANs) Amendment 1: MAC sublayer."

The network layer 508, 528, also referred to as the Internet Protocol (IP) layer, provides functionality such as breaking data from the application layer 504, 524 into packets or extracting data from incoming packets for use by the application layer 504, 524, populating packet headers with information such as source and destination addresses, providing mechanisms to discover and pair with other devices, supporting power savings, and enabling secure communication. The network layer 508, 528 may operate according to the Internet Engineering Task Force (IETF) RFC1460 entitled "Internet Protocol, Version 6 (IPv6) Specification." Additional information regarding using IPv6 in wireless sensor networks is available in IETF RFC4919 entitled "IPv6 over Low-Power Wireless Personal Area Networks (6LoWPANs): Overview, Assumptions, Problem Statement, and Goals."

The application layer 504, 524 serves as an interface between software operating on the device 500, 502 that sends and/or receives data on the wireless sensor network and the network layer 508, 528. This layer may contain any application operating on the device 500, 502 that communicates with other networked devices.

The example of FIG. 5 illustrates the flow of data from a sending wireless sensor device 500 to a receiving wireless sensor device 502. This example assumes that a prefix table has been created on the device 500 and includes at least one prefix as previously defined herein. The example further assumes that any stored IPv6 addresses, such as the IPv6 addresses of the device 500 and wireless sensor device 502, are stored in the address indicator format previously described herein.

To transmit data, the application layer 504 provides the data to the network layer 508 in a format expected by the network layer 508. The address indicators for any IPv6 addresses needed for transmitting the data to device 502 are decompressed by the IPv6 address management component 506 to re-create the IPv6 addresses and provided to the network layer 508. Further, IPv6 addresses in various network tables maintained by the network layer 508 are stored in the address indicator format. These addresses are decompressed by the IPv6 address management component 506 to re-create the IPv6 addresses corresponding to the original network table entries when needed by the network layer 508. Decompression of address indicators is previously described herein.

The network layer 508 breaks the data into one or more packets in which the IPv6 addresses are included in the header and provides the packets to the MAC layer 510, which operates with the PHY layer 512 to transmit the one or more packets to device 502.

On device 502, the received data passes through the PHY layer 532 and the MAC layer 530 and is provided to the network layer 528 in packet format. The network layer 528 processes the header information in each received packet and provides the data payloads to the application layer 524. Any IPv6 addresses that need to be stored on device 502 and/or are to be processed in the application layer 524 and/or are to be stored in the network tables of the network layer 528 are compressed by the IPv6 address management component 526 to generate address indicators for the addresses. These address indicators are then stored and/or provided to the application layer 524 and/or the network layer 528. Compression of IPv6 addresses to generate address indicators is previously described herein.

Figure 6:
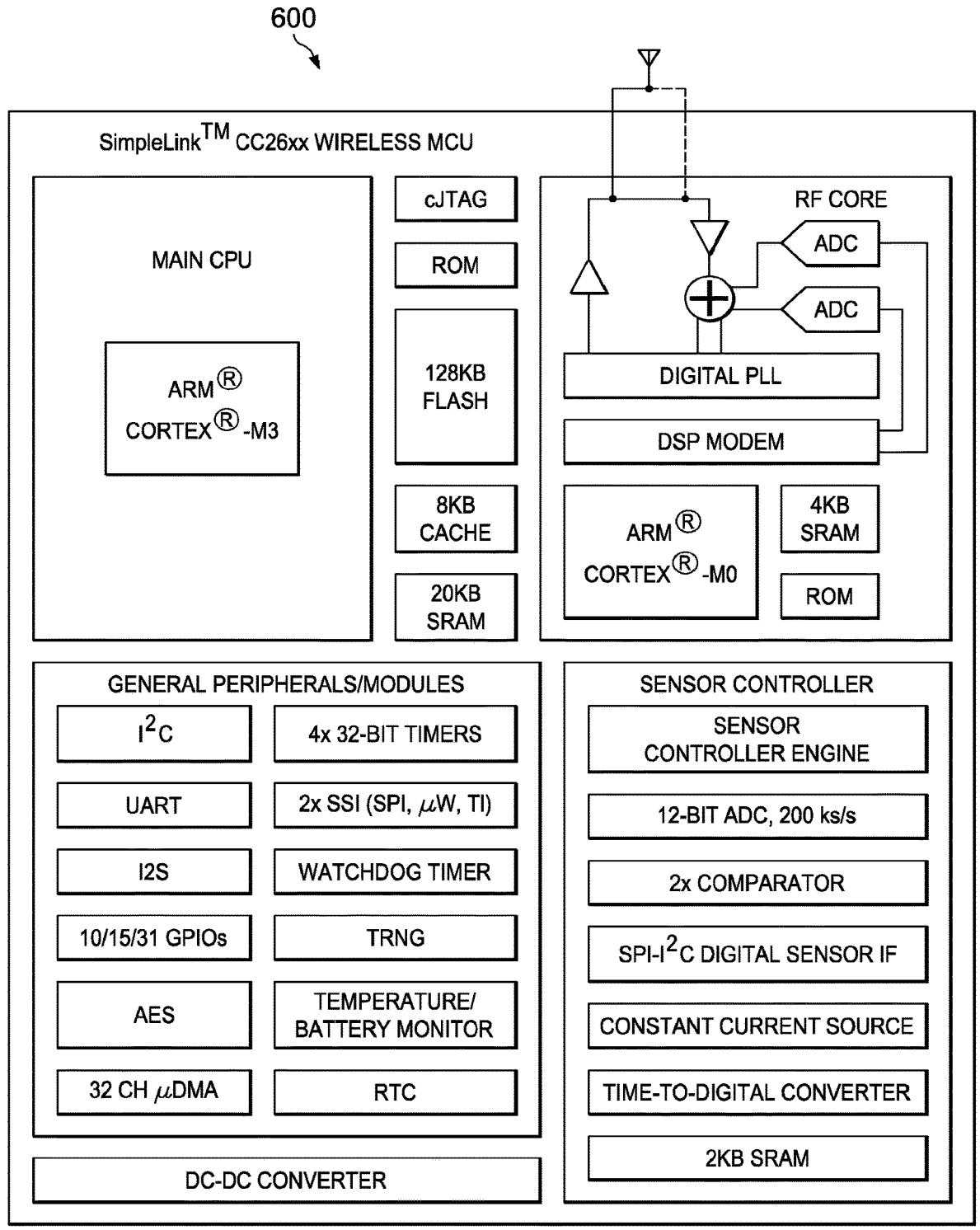
FIG. 6 is a simplified block diagram of an example wireless sensor device.

FIG. 6 is a simplified block diagram of an example wireless sensor device 600 that may be deployed in a wireless sensor network such as the example network of FIG. 1 and may be configured to perform IPv6 address management as described herein. More specifically, the example wireless sensor device 600 may be embodied as a CC26xx SimpleLink™ Multistandard wireless microcontroller (MCU) integrated circuit (IC) available from Texas Instruments. The CC26xx family of ultralow-power microcontrollers includes multiple devices featuring an ultralow power CPU and different peripherals targeted for various applications. The particular MCU depicted is the CC2650. A brief description of the CC2650 is provided herein. A detailed description of the CC2650 is provided in Texas Instruments publication SWRS158, "CC2650 SimpleLink™ Multistandard Wireless MCU," February 2015, which is incorporated by reference herein.

The MCU 600 incorporates a 32-bit ARM® Cortex®-M3 as the main processor and a peripheral feature set that includes an ultra-low power sensor controller for interfacing external sensors and/or collecting analog and digital data autonomously while the rest of the system is in sleep mode. The MCU 600 also incorporates an RF core based on an ARM® Cortex®-M0 processor. The RF core is designed to autonomously handle time critical aspects of various radio protocols. The RF core includes a dedicated 40 KB static random access memory (SRAM) and a dedicated read-only memory (ROM).

The MCU 600 also incorporates 128 KB of flash memory that provides nonvolatile storage for code and data, 20 KB of SRAM that can be used for both storage of data and execution of code, and a ROM storing a real-time operating system kernel and some lower layer protocol stack software such as 802.15.4 MAC software. General peripherals/modules on the MCU 600 may include a 12-bit ND converter, a 16-channel comparator with voltage reference generation and hysteresis capabilities, interfaces for SPI, Microwire, and UART protocols, internal direct memory access (DMA), a real-time clock, multiple 16/32-bit timers, and more.

Software instructions implementing network stack layers and the IPv6 address management described herein may be stored in a computer readable medium on the MCU 600 such as the flash memory, the SRAM, or the ROM on the MCU 600 and executed by the main CPU.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments of IPv6 address compression and decompression have been described herein that assume the common prefix of an IPv6 address is the high-order 15 octets and the last octet is a unique node address. One of ordinary skill in the art will understand embodiments in which the number of octets in the common prefix and the number of octets in the node address may differ. More generically, if there are M octets in a node address, then the common prefix is the (16-M) high-order octets. Thus, the prefix stored in the prefix table may be the high order (16-M) octets and the node address concatenated with the key to form an address indicator is the remaining lower order M octets. The example used to describe previous embodiments herein assumes M=1.

Certain terms are used throughout the description and the claims to refer to particular system components. As one skilled in the art will appreciate, components may be referred to by different names and/or may be combined in ways not shown herein without departing from the described functionality. This document does not intend to distinguish between components that differ in name but not function. In the discussion and in the claims, the terms "including" and "comprising" are used in an open-ended fashion, and thus should be interpreted to mean "including, but not limited to . . . ."

It is therefore contemplated that the appended claims will cover any such modifications of the embodiments as fall within the true scope of the disclosure.

What is claimed is:

1. A method comprising:
   storing, in a memory on a wireless sensor device in a wireless sensor network, a prefix table, the prefix table indexing an M-octet prefix of a first 128-bit Internet Protocol Version 6 (IPv6) address, M being a positive integer, wherein a key associated with the prefix table indicates a unique index in the prefix table of the M-octet prefix, wherein:
      the wireless sensor device is an end device;
      a first prefix of the first 128-bit IPv6 address comprises the M-octet prefix and a node address of the first 128-bit IPv6 address comprises (16-M)-octet of the first 128-bit IPv6 address other than the M-octet prefix; and
   forming, by the wireless sensor device, a first address indicator for the first 128-bit IPv6 address, wherein the first address indicator comprises the key and the node address of the first 128-bit IPv6 address;
   storing the first address indicator in at least one memory location on the wireless sensor device;
   receiving a second 128-bit IPv6 address on the wireless sensor device, the second 128-bit IPv6 address having the first prefix and a different node address than the node address of the first 128-bit IPv6 address;
   retrieving, by the wireless sensor device, the key associated with the first prefix;
   forming, by the wireless sensor device, a second address indicator for the second 128-bit IPv6 address, the second address indicator comprising the key and a node address of the second 128-bit IPv6 address; and
   storing the second address indicator in at least one memory location on the wireless sensor device.

2. The method of claim 1, in which the node address of the first and second 128-bit IPv6 addresses is a low-order (16-M)-octets of the respective 128-bit IPv6 address and the first prefix is a high-order M-octets of the respective 128-bit IPv6 address.

3. The method of claim 1, in which the first address indicator consists of sixteen bits, a high-order eight bits of the sixteen bits of the first address indicator storing a last octet of the first 128-bit IPv6 address as a node address and a low-order eight bits of the sixteen bits of the first address indicator storing the key.

4. The method of claim 1, including: using the key in the first address indicator to retrieve the first prefix; and generating the first 128-bit IPv6 address from the retrieved first prefix and the node address in the first address indicator.

5. The method of claim 1, including:
receiving a third IPv6 address on the wireless sensor device, the third IPv6 address having a second prefix different from the first prefix;
storing, on the wireless sensor device, the second prefix in association with a second key;
forming a third address indicator for the third IPv6 address, the third address indicator consisting of the second key and a node address of the third IPv6 address; and
storing the third address indicator in at least one memory location on the wireless sensor device.

6. The method of claim 1, wherein M is equal to fifteen.

7. The method of claim 1, wherein the key is a single octet.

8. The method of claim 1, wherein the first address indicator is two octets in size.

9. A wireless sensor device comprising:
a memory in the wireless sensor device storing software instructions for managing Internet Protocol Version 6 (IPv6) addresses, wherein the wireless sensor device is an end device; and
a processor in the wireless sensor device configured to execute software instructions, in which execution of the software instructions:
stores a prefix table, the prefix table indexing an M-octet prefix of a first 128-bit IPv6 address in a prefix table, M being a positive integer, wherein a first prefix of the first 128-bit IPv6 address comprises the M-octet prefix, a node address of the first 128-bit IPv6 address comprises (16-M)-octet of the first 128-bit IPv6 address, and a key associated with the prefix table indicating a unique index in the prefix table for the M-octet prefix;
forms a first address indicator for the first 128-bit IPv6 address, wherein the first address indicator comprises the key and the node address of the first 128-bit IPv6 address;
stores the first address indicator in at least one location in the memory;
receives a second 128-bit IPv6 address on the wireless sensor device, the second 128-bit IPv6 address having the first prefix and a different node address than the node address of the first 128-bit IPv6 address;
retrieves the key associated with the first prefix;
forms a second address indicator for the second 128-bit IPv6 address, the second address indicator comprising the key and a node address of the second 128-bit IPv6 address; and
stores the second address indicator in at least one location in the memory.

10. The wireless sensor device of claim 9, in which the node address for the first and second 128-bit IPv6 addresses is a low-order (16-M) octets of the respective 128-bit IPv6 address and the first prefix is a high-order M-octets of the respective 128-bit IPv6 address.

11. The wireless sensor device of claim 9, in which the first and second address indicator consists of sixteen bits, a high-order eight bits of the sixteen bits of the first address indicator storing a last octet of the respective first or second 128-bit IPv6 address as the node address and a low-order eight bits of the sixteen bits of the first address indicator storing the key.

12. The wireless sensor device of claim 9, in which execution of the software instructions further uses the key in the first address indicator to retrieve the first prefix and generate the first 128-bit IPv6 address from the retrieved first prefix and the node address in the first address indicator.

13. The wireless sensor device of claim 9, in which execution of the software instructions further receives a third 128-bit IPv6 address on the wireless sensor device, the third 128-bit IPv6 address having a second prefix different from the first prefix, stores the second prefix in the prefix table, forms a third address indicator for the third 128-bit IPv6 address, the third address indicator consisting of a second key indicating where the second prefix is stored in the prefix table and a node address of the third 128-bit IPv6 address, and stores the third address indicator in at least one location in the memory.

14. The wireless sensor device of claim 9, wherein M is equal to fifteen.

15. The wireless sensor device of claim 9, wherein the key is a single octet.

16. The wireless sensor device of claim 9, wherein the first address indicator is two octets in size.

17. A non-transitory computer readable medium storing software instructions that, when executed by a processor of a wireless sensor device in a wireless sensor network, cause a method to be performed, the method comprising:
storing, on the wireless sensor device, a prefix table, the prefix table indexing an M-octet prefix of a first 128-bit Internet Protocol Version 6 (IPv6) address, M being a positive integer, wherein the wireless sensor device is an end device, wherein a first prefix comprises the M-octet prefix, a node address of the first 128-bit IPv6 address comprises (16-M)-octet of the first 128-bit IPv6 address, and a key associated with the prefix table that indicates a unique index in the prefix table of the M-octet prefix;
forming a first address indicator for the first 128-bit IPv6 address, wherein the first address indicator comprises the key and the node address of the first 128-bit IPv6 address;
storing the first address indicator in at least one memory location on the wireless sensor device;
receiving a second 128-bit IPv6 address on the wireless sensor device, the second 128-bit IPv6 address having the first prefix and a different node address than the node address of the first 128-bit IPv6 address;
retrieving the key associated with the first prefix;
forming a second address indicator for the second 128-bit IPv6 address, the second address indicator comprising the key and a node address of the second 128-bit IPv6 address; and
storing the second address indicator in at least one memory location on the wireless sensor device.

18. The computer readable medium of claim 17, in which the node address of the respective first or second 128-bit IPv6 address is a low-order (16-M)-octets of the respective 128-bit IPv6 address and the first prefix is a high-order M octets of the respective 128-bit IPv6 address.

19. The computer readable medium of claim 17, in which the method includes:
  using the key in the first address indicator to retrieve the first prefix; and
  generating the first 128-bit IPv6 address from the first prefix and the node address in the first address indicator.

20. The computer readable medium of claim 17, in which the method includes:
  receiving a third 128-bit IPv6 address on the wireless sensor device, the third 128-bit IPv6 address having a second prefix different from the first prefix;
  storing, on the wireless sensor device, the second prefix in the prefix table;
  forming a third address indicator for the third 128-bit IPv6 address, the third address indicator consisting of a second key indicating where the second prefix is stored in the prefix table and a node address of the third 128-bit IPv6 address; and
  storing the third address indicator in at least one memory location on the wireless sensor device.

21. The computer readable medium of claim 17, wherein M is equal to fifteen.

22. The computer readable medium of claim 17, wherein the key is a single octet.

23. The computer readable medium of claim 17, wherein the first address indicator is two octets in size.

* * * * *